(12) United States Patent  
Chi

(10) Patent No.: US 8,456,030 B2
(45) Date of Patent: Jun. 4, 2013

(54) POWER TAKE OFF APPARATUS FOR A WEC

(75) Inventor: Wei-Ming Chi, Feasterville, PA (US)

(73) Assignee: Ocean Power Technologies, Inc., Pennington, NJ (US)

(*) Notice: Subject to any disclaimer, the term of this patent is extended or adjusted under 35 U.S.C. 154(b) by 533 days.

(21) Appl. No.: 12/798,054

(22) Filed: Mar. 29, 2010

(65) Prior Publication Data

US 2010/0259047 A1    Oct. 14, 2010

Related U.S. Application Data

(60) Provisional application No. 61/211,439, filed on Mar. 30, 2009, provisional application No. 61/211,440, filed on Mar. 30, 2009.

(51) Int. Cl.
*F03B 13/20* (2006.01)

(52) U.S. Cl.
USPC .................................................. 290/53

(58) Field of Classification Search
USPC ...................................... 290/53–55
See application file for complete search history.

(56) References Cited

U.S. PATENT DOCUMENTS

| 7,525,214 | B2* | 4/2009 | Atilano Medina et al. | 290/53 |
| 8,314,506 | B2* | 11/2012 | Rhinefrank et al. | 290/53 |
| 2010/0264659 | A1* | 10/2010 | Chi et al. | 290/53 |
| 2011/0012358 | A1* | 1/2011 | Brewster et al. | 290/53 |
| 2011/0037266 | A1* | 2/2011 | Wille et al. | 290/53 |
| 2011/0084488 | A1* | 4/2011 | Eder et al. | 290/53 |
| 2011/0089689 | A1* | 4/2011 | Gregory | 290/42 |
| 2011/0241347 | A1* | 10/2011 | Boureau et al. | 290/53 |

* cited by examiner

*Primary Examiner* — Truc Nguyen
(74) *Attorney, Agent, or Firm* — Henry I. Schanter, Esq

(57) ABSTRACT

A wave energy converter (WEC) includes a float which moves generally in phase with the waves and whose up and down motion is guided by and along a spar having an upper portion and a lower portion. A power take off (PTO) device is coupled between the float and the spar for converting their relative motion into useful energy. In some embodiments, the PTO includes (a) a drum having an axis of rotation rotatably mounted within one of the float and spar; and (b) cabling means connected between the drum and the other one of the float and spar for causing the drum to rotate as a function of the up and down motion of the float. In other embodiments, the PTO system is formed using a pre-tensioned roller chain wound around sprocket wheels located within one of the spar and float with the opposite ends of the chain connected to the other one of the spar and float to cause rotation of the sprocket wheels in response to movement of the float relative to the spar.

16 Claims, 12 Drawing Sheets

POWER TAKE OFF APPARATUS FOR A WEC

This invention claims priority from provisional application Ser. No. 61/211,439 filed Mar. 30, 2009 titled POWER TAKE OFF APPARATUS FOR A WEC and provisional application Ser. No. 61/211,440 filed Mar. 30, 2009 titled POWER TOWER FOR WAVE ENERGY CONVERTER, the teachings of which are incorporated herein by reference.

BACKGROUND OF THE INVENTION

This invention relates to an improved power take off device (PTO) for use in wave energy conversion systems (WECs).

In general, WECs include: (a) a float (shell) which moves in phase with the waves; (b) a spar or column which is either stationary with respect to the float or moves out of phase relative to the float; and a power take off device (PTO) coupled between the float and spar to convert their relative motion into a useful form of energy (e.g., electric power).

Many different types of PTOs have been suggested. However, there exists a need to have a PTO which is more efficient, reliable, and economical than those presently known.

Present WEC technology relies on the float moving along and in phase with the wave surface but guided by the spar which has a submerged end connected to the sea bed or to a heave plate which renders the spar relatively stationary. The relative linear motion between the float and spar is transferred through a linear thrust rod to drive a power take-off system located in the spar. As the power take-off system is generally placed inside the spar, a water and air tight chamber needs to be formed within the spar and a linear seal at the top of the spar.

A problem with current designs is that a linear seal system has to be placed at the top of the spar to interface the thrust rod and ensure that water and air will not enter into the spar. The seal system also serves as a linear bearing system to guide the thrust rod. The linear seal is a weak link in the system because it is extremely difficult to provide a reliable seal. A goal is to eliminate the need for the linear seal system.

It is therefore desirable to replace the linear seal with a rotary seal type system which is more developed and reliable.

Another problem with current designs is that the thrust rod needs to transfer the relative linear motion between the float and the spar while interfacing with the linear seal. In addition to generally limiting the length of the stroke, the thrust rod has to handle significant loads in both compression and tension and must also have high wear resistance. The linear thrust rod is one of the most expensive and weakest items in current WEC designs. The thrust rod also has limited scalability in larger systems. It is therefore desirable to replace the thrust rod with a more reliable and economical system.

The problems with the thrust rod and linear seal are avoided in systems embodying the invention. In WEC systems embodying the present invention the transfer of float motion via a thrust rod is eliminated as well as the need for a linear seal.

SUMMARY OF THE INVENTION

WECs embodying the invention include a float which can move along the full length of a spar (up to where stops are formed) in response to the waves. A power take off (PTO) device is coupled between the float and the spar for converting their relative motion into useful energy.

In general, the PTO includes: (a) any rotatable object (e.g., a drum, bobbin spool) having an axis of rotation rotatably mounted within one of the float and spar; and (b) cabling means connected between the rotatable object (e.g., drum) and the other one of the float and spar for causing the rotatable object (e.g., drum) to rotate or spin as a function of the up and down motion of the float.

In one embodiment of the invention, the PTO's rotatable object is a drum which is rotatably mounted within the float. A first cable is attached at one end to the top region of the spar, wrapped around the drum and attached at its other end to the drum. A second cable is attached at one end to the bottom region of the spar, wrapped around the drum and attached at its other end to the drum. As the float moves up and down the first and second cables apply differential tension to the drum causing it to rotate. The drum has a shaft connected directly or via a gear box to an electric generator to generate electric energy. Note that the generator can also be used in a motor mode for testing, or to drive power back into the float to establish resonance and thereby achieve optimum power capture.

In accordance with another aspect of the invention, drums may be rotatably mounted to, or in, the spar and cables may be coupled between the drum and the float to cause the drums to rotate as the float moves up and down relative to the spar, in response to wave motion.

In the discussion to follow and in the appended claims, the term "toothed" as applied to a surface of a structure is generally intended to include any cogs, ridges, and/or any type of extensions normal to the surface where their function is primarily for transmitting motion or movement. The term "sprocket" (also referred to as a "sprocket wheel") refers to a toothed wheel or cylinder or other machine element that meshes with another toothed element to transmit motion or to change speed or direction. The term "drum" as used herein and in the appended claims refers to any otherwise rotatable object mountable within a float or spar such as, but not limited to, a bobbin, spools, or reels.

In accordance with still another aspect of the invention, the PTO includes an appropriately tensioned chain (e.g., conveyor or transmission) engagingly connected about at least one (or more) sprocket wheel rotatably mounted within the float. The two ends of the chain are fixedly connected to respective upper and lower regions of the spar. As the float moves, relative to the spar, at least one sprocket wheel rotates. The shaft of the sprocket wheel is coupled to the shaft of a generator/motor either directly or via a gear box to generate power.

Alternatively, the sprocket wheels can be rotatably mounted on, or in, the spar and the chain connected to the float to cause the sprocket wheels to rotate as the float moves up and down. As above, generators are connected to the sprocket wheels to generate electric power as the sprocket wheels rotate.

Systems embodying the invention may include a plurality of PTO modules inside the float or the spar. The advantage of using a plurality of PTO modules is that if any module malfunctions, the remaining modules may still be operative.

A feature of the invention is that the PTO relies on a rotary mechanical driving mechanism and includes rotary bearings and rotary seals. Therefore, the need for a thrust rod or for linear seals is eliminated. The advantages of the invention therefore include, but are not limited to: the use of lighter components than those used in a mechanical rigid-linkage linear driving system; the use of rotary bearings and rotary seals which are more developed and reliable than linear seals; and the elimination of the expensive and unreliable thrust rod.

BRIEF DESCRIPTION OF THE DRAWINGS

In the accompanying drawings (which are not necessarily drawn to scale) like reference characters denote like components.

DETAILED DESCRIPTION OF THE DRAWINGS

Figure 1B:
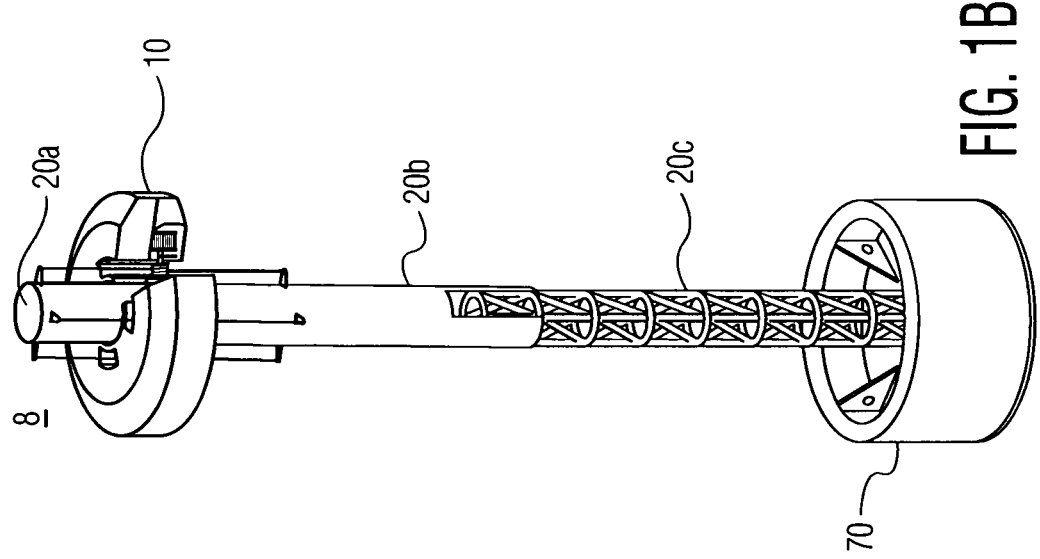
FIG. 1B is a view of a WEC for use with the invention when the spar is fully extended.
Figure 1A:
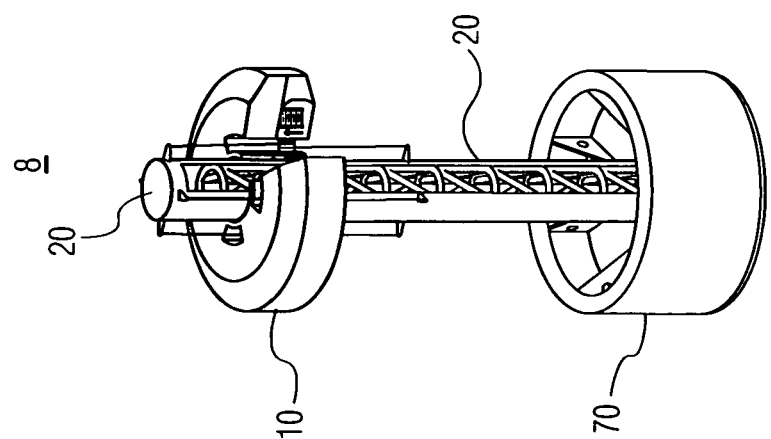
FIG. 1A is a view of a WEC for use with the invention in a non deployed condition.

FIG. 1A shows a wave energy converter (WEC) 8 comprising a float 10 which can move up and down relative to a spar 20 as a function of, and in-phase with, the waves. A heave plate 70 is shown connected to the bottom portion of the spar 20. In FIG. 1A part of the spar is folded over to facilitate the towing and deployment of the WEC in deeper water. FIG. 1B shows the WEC 8 as it would be deployed in a body of water. The deployed dimension is meant to show that the spar may be fully extended. The bottom portion of the spar will be submerged and remain submerged when the WEC is operational.

Figure 2:
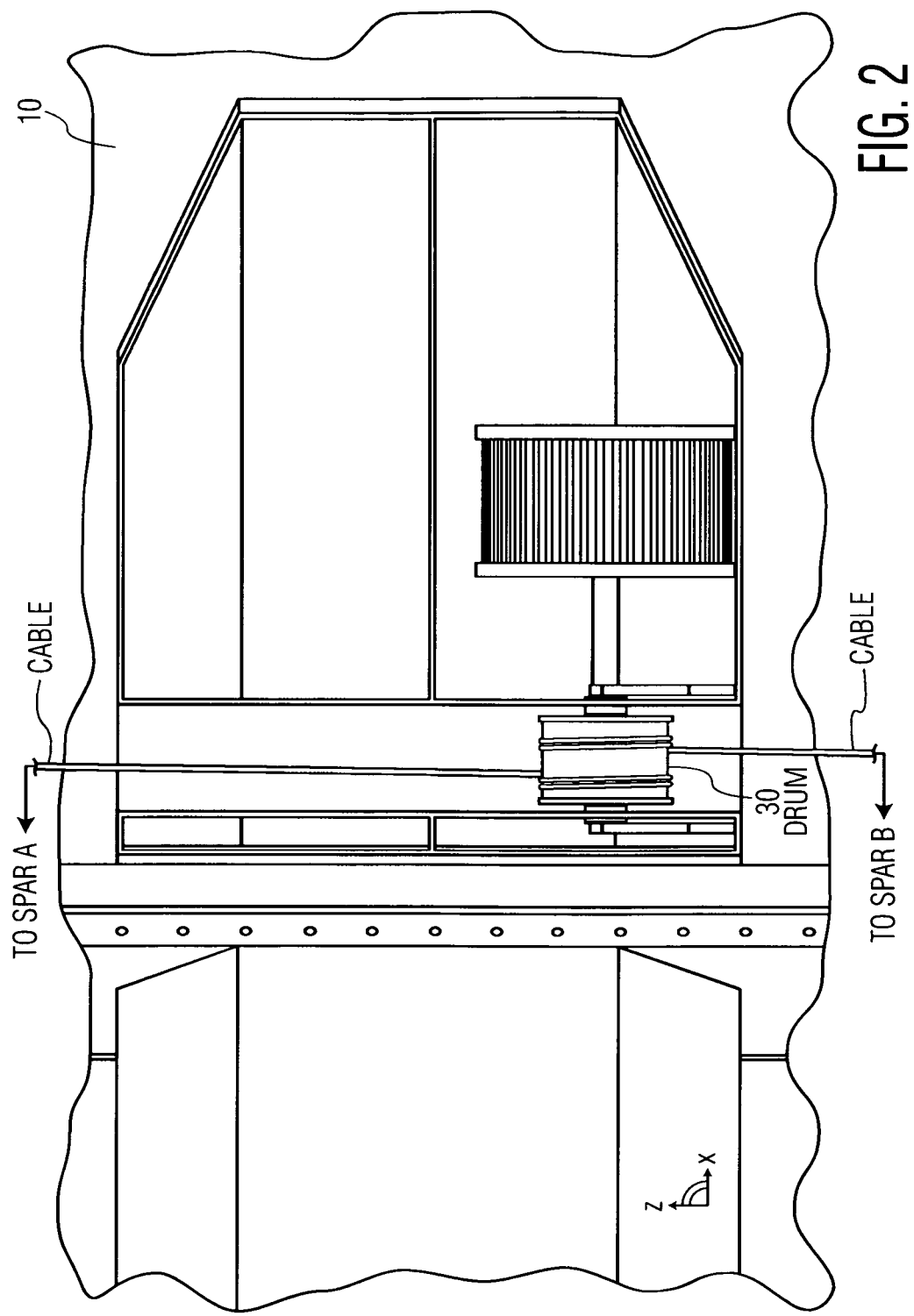
FIG. 2 is a highly simplified cut away view of part of a PTO embodying the invention, including a drum assembly located or mounted within a float so the drum can rotate as the float goes up and down relative to the spar, the drum being made to rotate by means of pull-up and pull-down cables wrapped around the drum and terminating at opposite points along the spar.
Figure 2A:
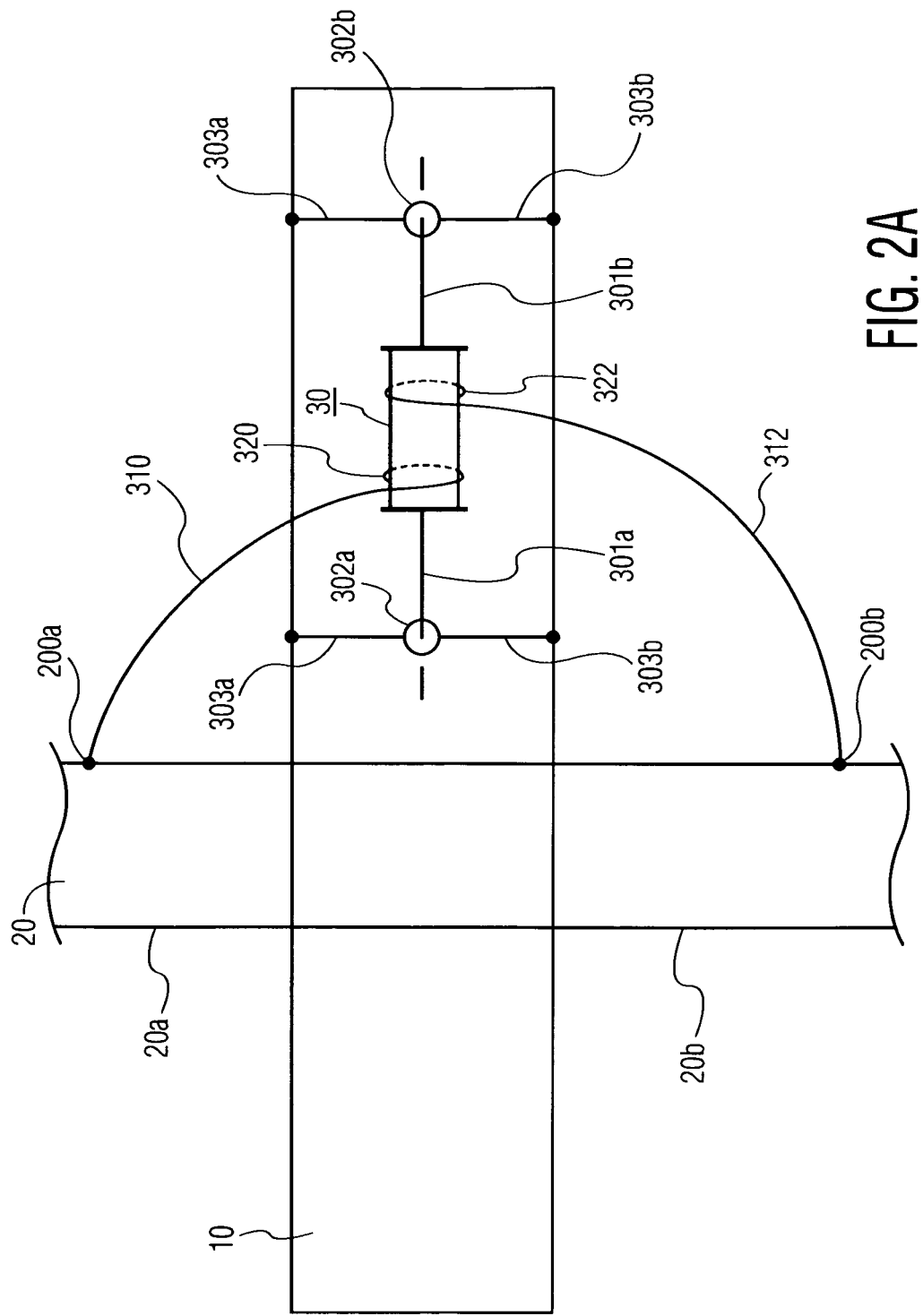
FIG. 2A is an illustrative diagram of a drum mounted within a float with cables wound around the drum and attached to the spar, in accordance with the invention.
Figure 2B:
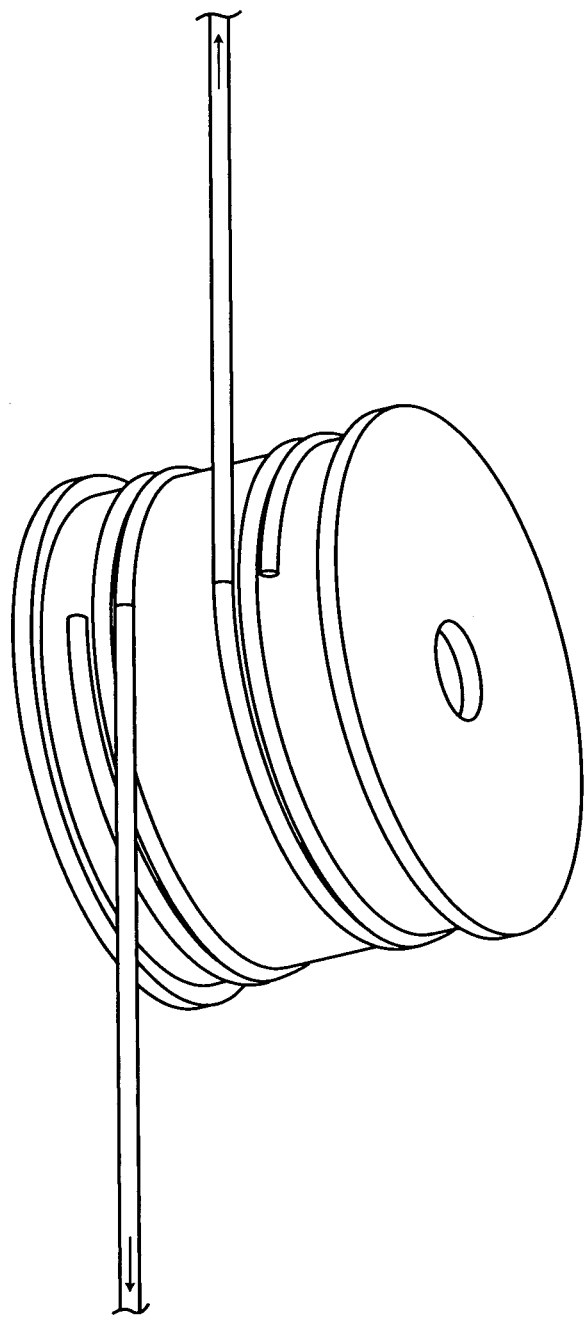
FIG. 2B is a drawing of a cable-drum assembly which can be used to practice the invention.
Figure 2C:
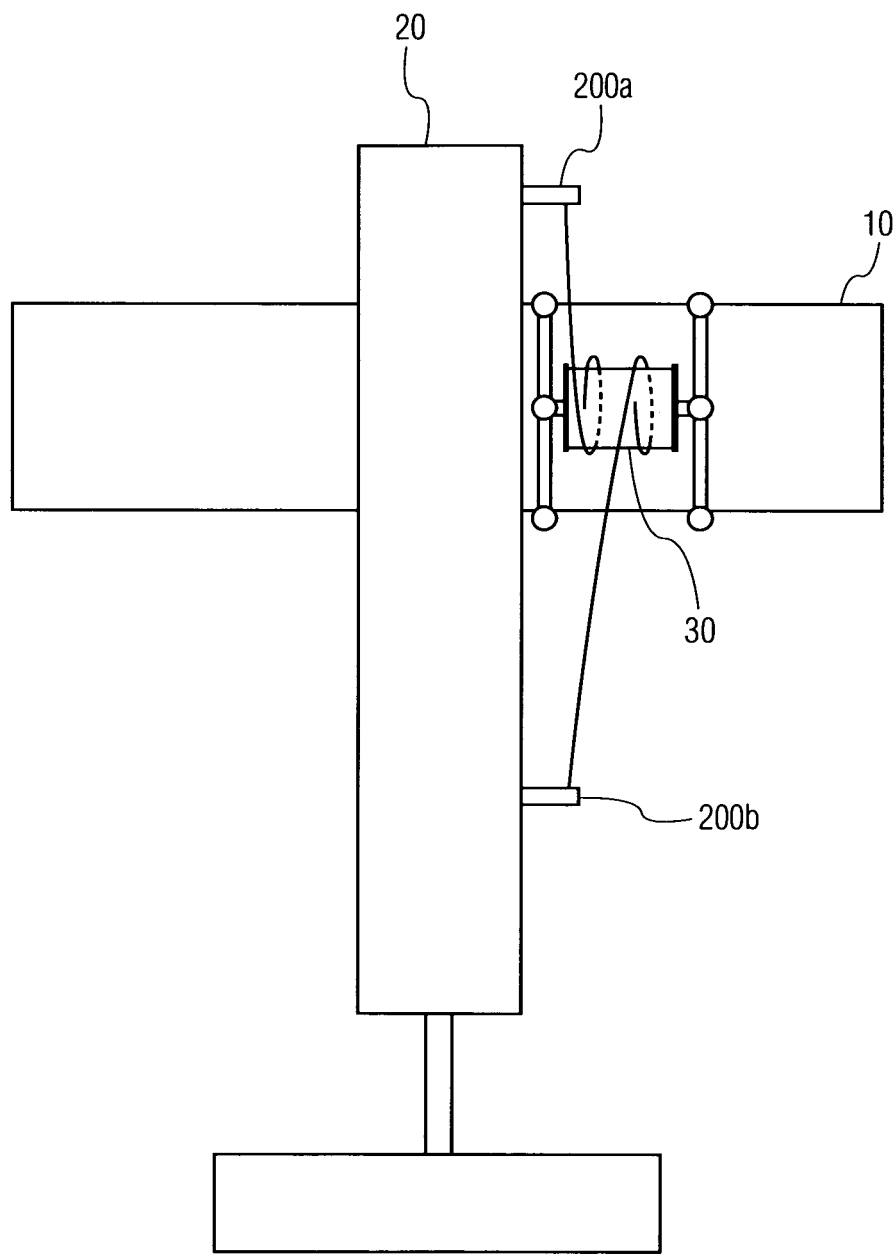
FIG. 2C is a conceptual view of the spar and float with a cable and drum assembly formed in accordance with the invention.

FIGS. 2 and 2A show a drum 30 having spindles (shafts or axles) 301a and 301b attached to the drum and extending axially outward from the drum. The shafts 301a, 301b pass through respective rings 302a, 302b which are located and suspended between the top surface and bottom surface of the float and which permit the drum to rotate in either the clockwise or counterclockwise direction. The rings 302a, 302b are held stationary, and in place, via respective upper rods 303a attached to the top of the float 10 and respective lower rods 303b attached to the bottom of the float 10. So mounted, the drum 30 can rotate relatively freely in either direction. Note that the drum is free to rotate while held (fixedly) in place within the float. A rope/cable 310 is shown connected at one end to a fixed point 320 on the drum. The rope/cable 310 is wrapped around the drum and connected at its other end to an upper point 200a on the spar, where point 200a is above the float. A rope/cable 312 is shown connected to a fixed point 322 on the drum, wrapped around the drum and then to a point 200b on the spar, below the float.

Cables 310 and 312 will be held in tension to cause rotation (spinning) of the drum 30 whenever the float moves. Springs may be attached to the ends of the cable to ensure there is appropriate tension.

Figure 3:
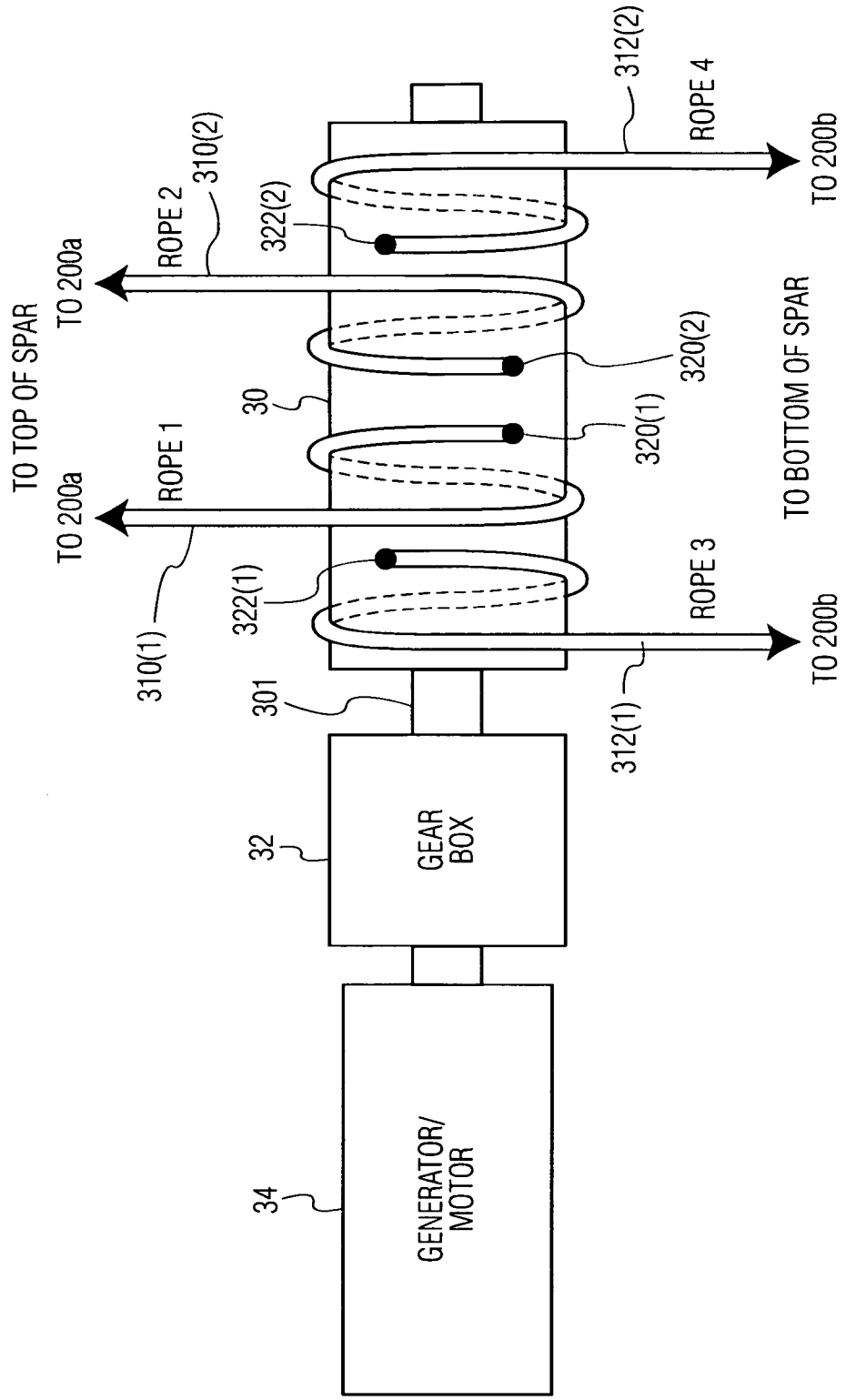
FIG. 3 is an illustrative diagram showing the coupling of a drum-cable assembly to a gear box to increase the rotational speed for driving a generator in accordance with the invention.

Typically, due to the movement of the waves the float 10 will move up and down, generally in phase with the waves. The movement of the float causes tensile fortes to be applied to the cables 310 and 312. The differences between the tensile forces applied to the cables cause the rotation (spinning) of the drum 30. As the float 10 moves up, the lower rope/cable 312 will encounter additional tensile force while the tensile force in the upper cable decreases. The difference between the tensile forces in the upper and lower cables causes the drum to be spun (rotate). The shaft 301 (a or b) of drum 30 is coupled via a gear box 32 to drive a generator/motor 34, as shown in FIG. 3. The gear box 32 functions to increase the rotational speeds so the generator can rotate at a higher speed and operate more efficiently.

As the float 10 moves down, the upper rope/cable 310 will encounter additional tensile force while the tensile force in the lower cable decreases. The difference between the tensile forces in the upper and lower cables causes the drum to be spun (rotate) and the drum will be spun (rotate) to drive the generator.

The direction of rotation of the drum for the float moving down will be opposite to the direction for the float moving up. Where the drum drives an AC generator whose output is rectified, the change in rotational direction does not affect the power production. If it is desired to have unidirectional rotation, a clutch assembly can be coupled at an appropriate point along the assembly comprising the drum, gearbox, and generator.

FIG. 3 illustrates that the drum 30 is coupled to a gear box 32 which in turn is connected to a motor/generator 34. In FIG. 3 two ropes [310(1), 310(2)], also designated as Rope 1 and Rope 2, are shown connected in generally parallel fashion between fixed points [320(1), 320(2)] on the drum and a point (or points) 200a along the upper portion of the spar 20. In a symmetrical fashion, two ropes [312(1), 312(2)], also designated as Ropes 3 and Rope 4, are shown connected in generally parallel fashion between fixed points [322(1), 322(2)] on the drum and a point (or points) 200(b) along the bottom portion of the spar. The number of ropes connected in parallel is determined by a safety factor required and/or set for reliable operation in the system. When the load required in the WEC system increases, the number of ropes can be increased and/or the rope size can be increased. This system enables the scalability of the WEC from light load designs to heavy load designs. This multiple rope system can also provide the benefit of redundancy.

Each rope may be pre-loaded to keep intimate contact between the rope and drum. Also, each rope may have a spring attachment to the spar (not shown) to compensate for creep and like effects.

Figure 4:
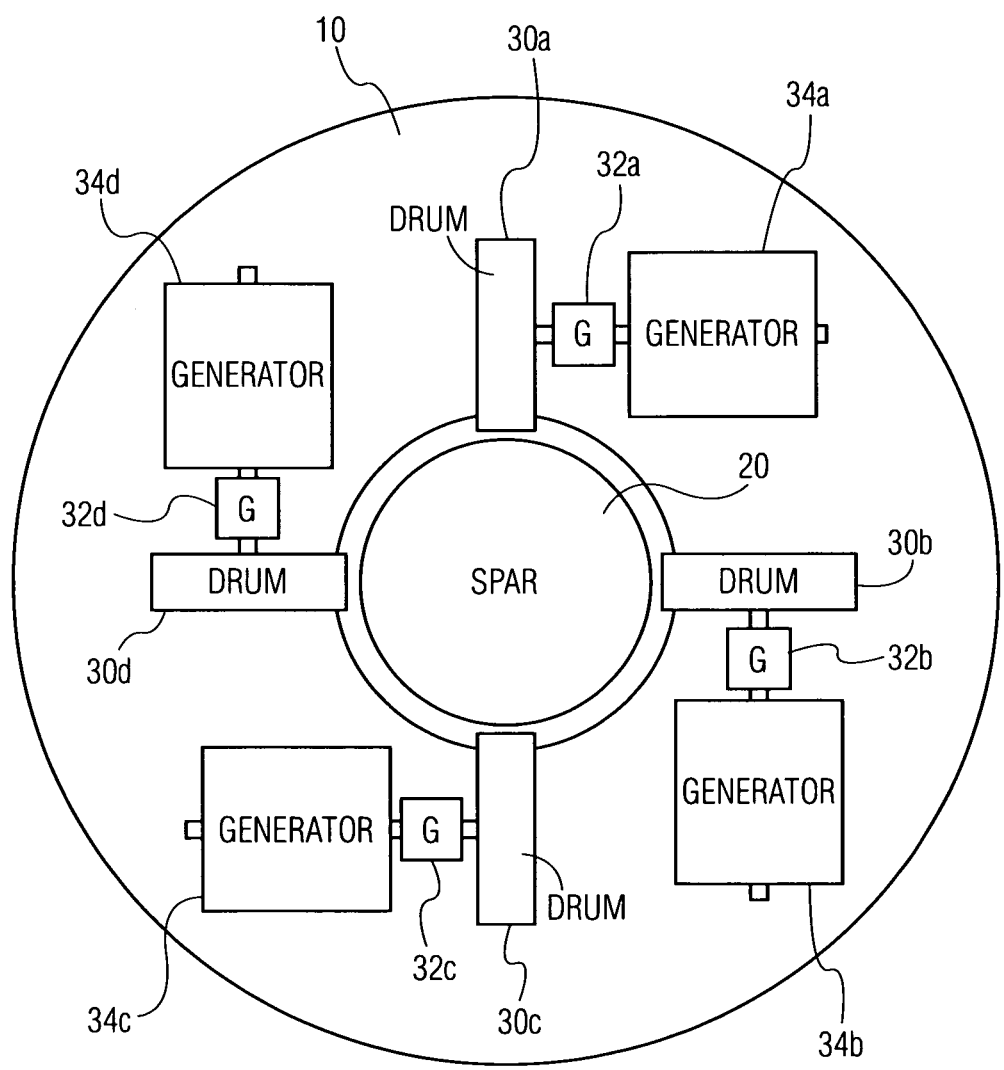
FIG. 4 is a top view of a WEC system with four PTO modules, (i.e., four (4) drum, gear box and generator assemblies), embodying the invention, coupled between the spar and float.

FIG. 4 is an illustrative view through the float 10 and spar 20 to show that a multiple number of PTO modules can be connected between the spar and float. For purpose of illustration, there is shown multiple drums (30a, 30b, 30c and 30d) and their associated gear boxes (32a, 32b, 32c and 32d) driving their corresponding motor/generator assemblies (34a, 34b, 34c and 34d). This illustrates that power generation can be distributed among more than one PTO module. Thus, in case one module malfunctions or is rendered inoperative, the remaining modules remain operative and provide or produce power. In FIG. 4 the spar and float are shown to have circular cross section. This is for purpose of illustration only. These components may be formed using any number of different and suitable shapes.

The system provides significant degrees of freedom for selecting different rope size, rope material, and number of ropes, of which the combinations can be easily adjusted to meet the design optimization without significantly impacting the WEC design itself. The cables themselves may also be formed of suitable material.

In FIGS. 1 through 4, the PTO is located within the float. The invention may also be practiced with the PTO module 27, which corresponds to and has the elements shown in FIG. 3, located within or about the spar.

Figure 5:
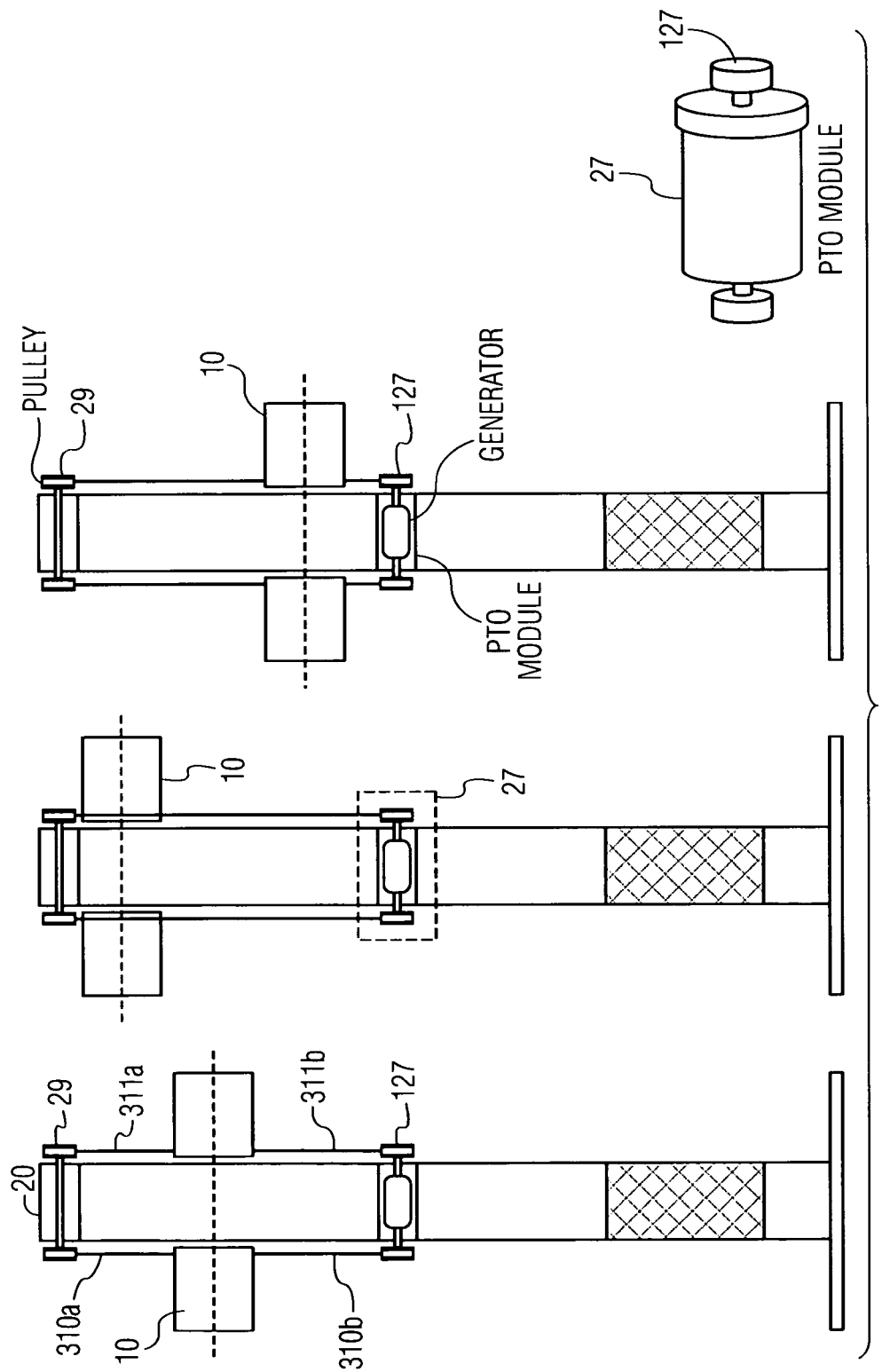
FIG. 5 is a diagram illustrating the positioning of a drum assembly within the spar and a float driving the drum using pulleys, in accordance with the invention.
Figure 5A:
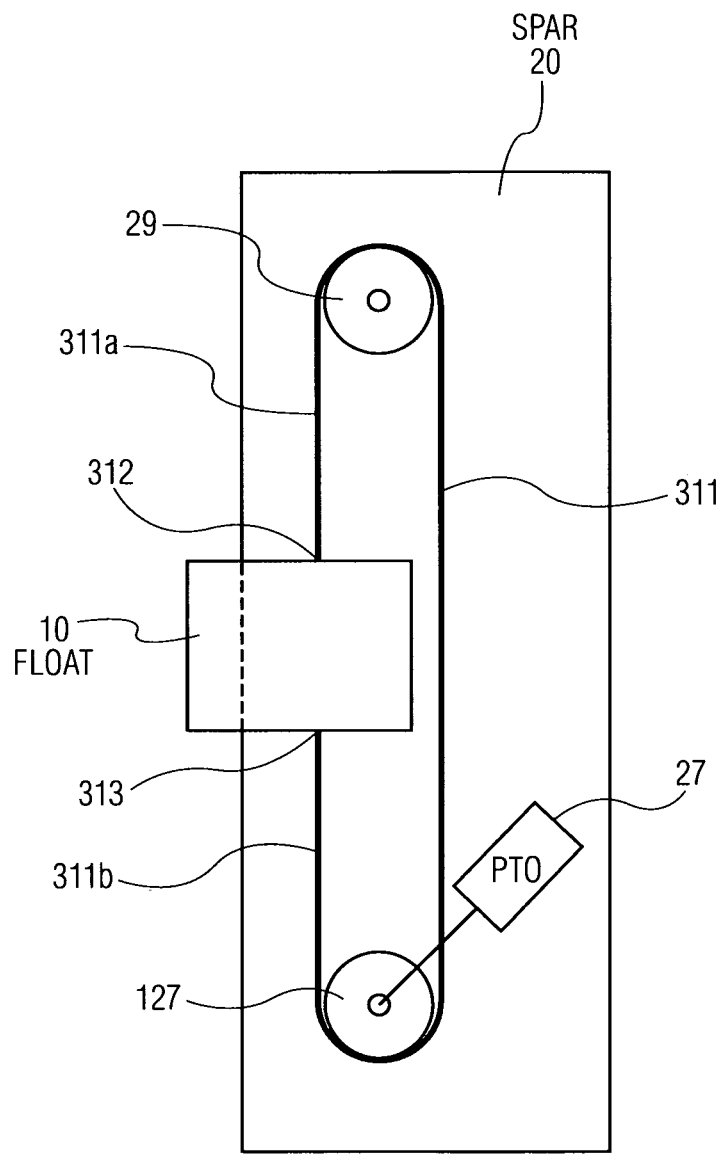
FIG. 5A is a diagram showing a side view of the embodiment illustrated in FIG. 5.

For example, in FIGS. 5 and 5A, the PTO module 27 is located within spar 20. An interconnecting cable (or chain, belt, or rope) is wrapped around an upper pulley 29 and a lower rotatable drum (or pulley) 127 to which is connected the PTO module 27. Upper pulley 29 may be rotatable or fixed (i.e., not rotatable) while drum 127 is always rotatable in order to drive the PTO module. In both cases, both pulley 29 and rotatable drum 127 have fixed vertical positions relative to (and along) the spar. A cable 311 terminates at one end 312 to the top side of the float, wraps around pulley 29 and drum 127 and terminates at its other end 313 to the bottom side of the float. For ease of description the portion of the cable above the float is identified as 311a and the portion below the float as 311b. When the float moves up relative to the spar 20, the cable encounters tensile forces causing drum 127 to rotate in a first direction. When the float moves down relative to the spar 20, the cable encounters tensile forces causing drum 127 to rotate in a second direction, opposite to the first direction. The rotation of drum 127 is imparted to its corresponding PTO module, which typically will include a generator to produce electric power.

Figure 6:
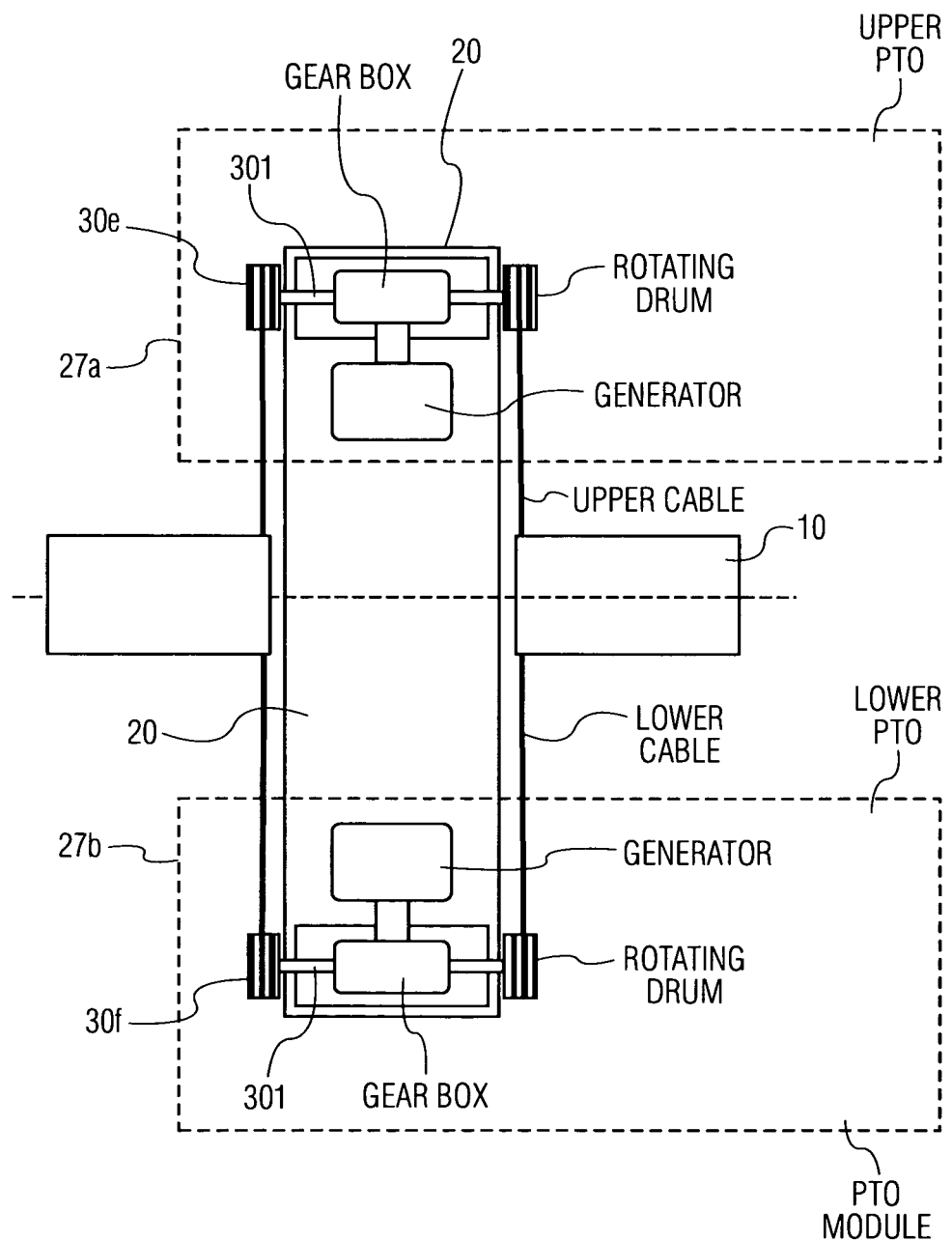
FIG. 6 is a diagram illustrating a float driving drum assemblies positioned along the upper and lower ends of a spar.

FIG. 6 shows that the float 10 may be used to drive an upper PTO 27a located along, or within, the upper portion of the spar and also drive a lower PTO 27b located along, or within, the lower portion of the spar. That is, the upper pulley system of FIG. 5 may be replaced with another drum (e.g., 30e) and PTO module combination. In FIG. 6, each drum (30e, 30f) has a shaft 301 connected to a gear box which is connected to a generator. The drums are caused to rotate via the differential pull of the upper and lower cable resulting from movement of the float relative to the spar.

It should be appreciated that the mechanical driving system provides higher efficiency and reliability than known hydraulic systems. In particular, the invention described relies on rotational motions, which leads to the utilization of rotary seals and rotary bearings, both of which are considered more reliable and more economical. In general, hydraulic system tends to leak as soon as the linear motions of hydraulic cylinders start. In particular, the hydraulic efficiency will significantly drop when the hydraulic seals start degrading.

Drum-pulley cable systems of the type shown can be made compact with a high safety factor. The design relies on using rotary seal and rotary bearings which tend to be cheap and reliable. The gear boxes make it possible to operate the generators at a higher speed and more efficiently. The components of the PTO may be modular enabling in-site maintenance and replacement.

The cable drum PTO system may also be referred to as a wire and pulley PTO system. This system is suitable for a very long stroke (~25 m) to allow for the tidal range and the distance between the maintenance (high) and storm (low) positions of the float. Consequently, the novel PTO techniques described herein accommodate the very long stroke which is desired for use with the types of WECs also described here.

As already described, the wire and pulley PTO includes a rotating drum which is made to rotate as the float moves up and down. The drum is connected via several wires wrapped around pulleys, which are in turn corrected via a gearbox, or directly to a generator/motor. The generator/motor may be located within the float or the spar. As the float moves up and down, in response to the waves, the WEC is used to drive the generator to generate electric power. This defines the generator mode during which power will be captured and converted as the float moves up and down. Alternatively, the generator/motor can be operated as a motor (the motor mode) and the motor can then be used to drive the float up (above the waves) to a maintenance position or down (fully submerged) to the storm position. The motor/generator can also be used in the motor mode for testing, or to drive power back into the float to establish resonance and thereby achieve optimum power capture.

Figure 7C:
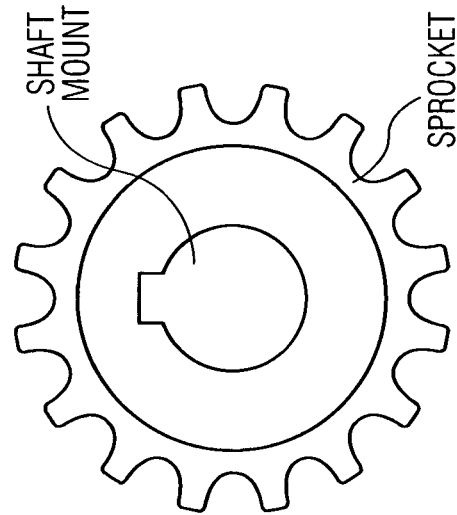
FIGS. 7(b) through 7(e) are detailed views of parts of the PTO of FIG. 7(a).
Figure 7B:
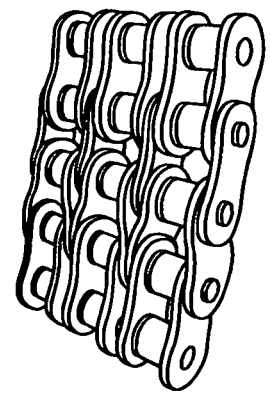
Figure 7A:
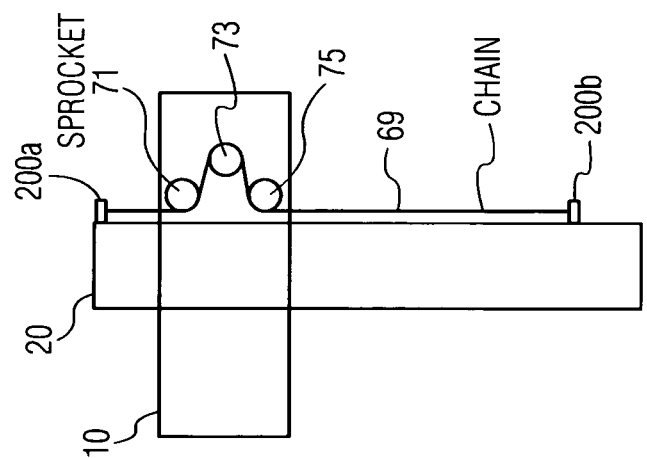
FIG. 7(a) is a highly simplified cross sectional diagram of a spar and float with a chain and sprocket PTO connected between them.
Figure 7D:
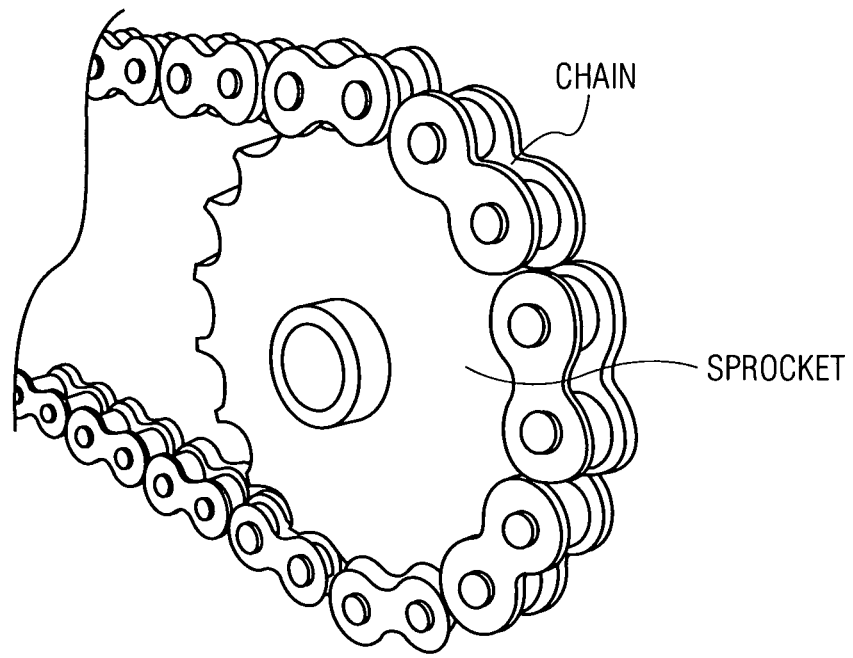
Figure 7E:
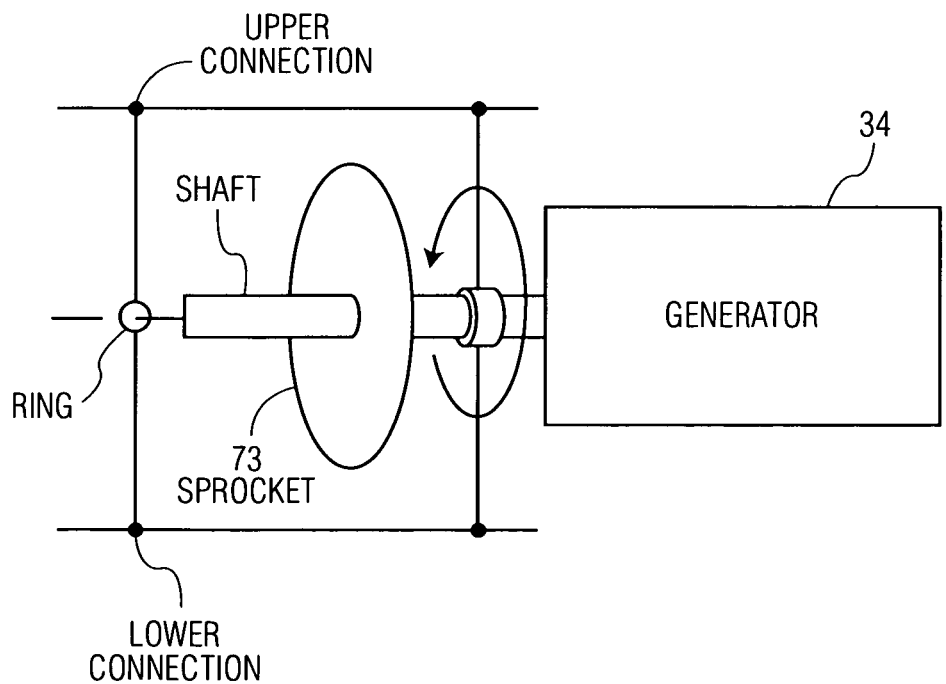

FIG. 7(a) shows that a PTO system embodying the invention may also be formed using a pre-tensioned roller chain or conveyor chain extending from an upper part of the spar and engagingly wrapped around sprocket wheels (and idlers) located within the float and then extending to a lower part of the spar. The shaft of an electric generator and/or gear box is connected to the shaft of a sprocket Wheel which is engaged with the chain. When the float moves up and down the sprocket wheel is rotated and drives the generator and/or gear box. FIGS. 7(a) through 7(e) show the PTO with a link chain (e.g. conveyor or transmission), 69, connected between the upper point 200a of a spar 20 wound around sprocket wheels (71,73,75) rotatably mounted within the float 10. The sprockets of the sprocket wheels are designed to engage the chain which is connected to the lower part of the spar 200b. As the float moves up and down the sprocket wheels rotate and cause an electric generator 34, coupled to the sprocket wheels, to rotate to produce electrical power. In the embodiment of the invention shown in FIG. 7, see FIGS. 7(a) and 7(e), the sprocket wheels (71,73,75) are free to rotate while held in place within the float 10, in a similar manner to that shown for the drum in FIG. 2A. In FIG. 7(a) one chain and 3 sprockets are shown. Two of the three sprockets are pre-loaded and engaged with the link chain to ensure tension and rotation of the sprockets. It should be appreciated that there may be more than one set of chains and sprocket wheels coupled between the spar and float in a similar manner to the showing of FIG. 4. FIG. 7(b) shows a typical link chain. FIG. 7(c) shows a sprocket wheel with a shaft hole for mounting the sprocket wheel on a shaft and a keyed section to secure holding the sprocket in place. FIG. 7(d) shows a sprocket wheel whose sprockets are engaged with the links of a chain. FIG. 7(e) illustrates a sprocket wheel mounted and held in place but capable of rotating and turning a generator 34. The arrangement shown is illustrative only and other arrangements may be used to practice the invention.

Alternatively, to the embodiment shown, the sprocket wheels may be mounted on or along the spar and designed to held engage with a chain connected about the float so as to cause rotation of the sprocket wheels in response to movement of the float relative to the spar.

What is claimed is:
1. A wave energy converter (WEC) comprising:
a float for moving up and down in phase with the waves;
a spar for guiding the up and down movement of the float;
the spar having an upper portion and a lower portion, the lower portion of the spar intended to be permanently submerged when the WEC is operational; and a power take off (PTO) device coupled between the float and the spar for converting their relative motion into useful energy including:
(a) a drum having an axis of rotation rotatably mounted within one of the float and spar; and
(b) cabling means connected between the drum and the other one of the float and spar for causing the drum to rotate as a function of the up and down motion of the float.

2. A WEC as claimed in claim 1 wherein a generator is coupled to the drum such that the generator produces electrical energy as the drum rotates.

3. A WEC as claimed in claim 2 wherein the generator is coupled to the drum via a gear box to increase the rotational speed of the generator.

4. A WEC as claimed in claim 1, wherein the drum has an axis of rotation rotatably mounted within the float; and wherein said cabling means includes first and second cables, each cable having two ends; and wherein the first cable is connected at one end to the upper portion of the spar and at its other end to the drum; and wherein the second cable is connected at one end to the lower portion of the spar and is connected at its other end to the drum; the connections of the cables to the drum causing the drum to rotate as a function of the up and down motion of the float.

5. A WEC as claimed in claim 4, wherein the drum is fixedly positioned between the upper and lower sides of the float while being free to rotate in a clockwise or counterclockwise direction.

6. A WEC as claimed in claim 5, wherein the drum is coupled via a gear box to an electric generator to produce electrical energy.

7. A WEC as claimed in claim 1, wherein the drum has an axis of rotation rotatably mounted at a section of the spar; and wherein said cabling means includes first and second cables, each cable having two ends; and wherein the first and second cables are connected between the float and the drum for causing the drum to rotate as a function of the up and down motion of the float.

8. A WEC as claimed in claim 7, wherein the drum is fixedly positioned relative to the spar while being free to rotate in a clockwise or counterclockwise direction.

9. A WEC as claimed in claim 8, wherein the drum is coupled via a gear box to an electric generator to produce electrical energy.

10. A wave energy converter (WEC) comprising:
a float for moving up and down in phase with the waves;
a spar for guiding the up and down movement of the float; the spar having an upper portion and a lower portion which is intended to be permanently submerged when the WEC is operational; and
a power take off (PTO) device coupled between the float and the spar for converting their relative motion into useful energy including:
(a) a drum rotatably mounted within the float; and
(b) first and second cables, each cable having two ends; and where the first cable is connected at one end to the upper portion of the spar and at its other end to the drum; and the second cable is connected at one end to the lower portion of the spar and at its other end to the drum; the connections of the cables to the drum causing the drum to rotate as a function of the up and down motion of the float.

11. A wave energy converter (WEC) as claimed in claim 10 where the drum has a shaft coupled to an electric generator for producing electric energy.

12. A wave energy converter (WEC) comprising:
a float for moving up and down in phase with the waves;
a spar for guiding the up and down movement of the float; the spar having an upper portion and a lower portion which is intended to be permanently submerged when the WEC is operational; and
a power take off (PTO) device coupled between the float and the spar for converting their relative motion into useful energy including:
(a) a drum rotatably mounted along a portion of the spar; and
(b) first and second cables; each cable having two ends; wherein the first and second cable are connected between the drum and the float so as cause the drum to rotate as a function of the up and down motion of the float.

13. A wave energy converter (WEC) comprising:
a float for moving up and down in phase with the waves;
a spar for guiding the up and down motion of the float; the spar having an upper portion and a lower portion, the lower portion being intended to be permanently submerged when the WEC is operational; and
a power take off (PTO) device coupled between the float and the spar for converting their relative motion into useful energy including:
(a) a link chain extending between the upper and lower portions of the spar; and
a rotatable sprocket arrangement located within the float and contacting the chain and its links for causing the rotatable sprocket arrangement to rotate as the function of the up and down motion of the float.

14. A WEC as claimed in claim 13 wherein a generator is coupled to the rotatable sprocket arrangement such that the generator produces electrical energy as the sprocket arrangement rotates.

15. A WEC as claimed in claim 13 wherein the sprocket arrangement includes at least two sprockets rotatably mounted within the float and wherein the chain extends within the float and is engagingly coupled with the sprockets to cause them to rotate.

16. A wave energy converter (WEC) comprising:
a float for moving up and down in phase with the waves;
a spar for guiding the up and down movement of the float; the spar having an upper portion and a lower portion which is intended to be permanently submerged when the WEC is operational; and
a plurality of power take off (PTO) modules coupled between the float and the spar for converting their relative motion into useful energy; each PTO module including:
(a) a drum having an axis of rotation rotatably mounted within one of the float and spar; and
(b) cabling means connected between the drum and the other one of the float and spar for causing the drum to rotate as a function of the up and down motion of the float.

* * * * *